(12) United States Patent
Kambegawa

(10) Patent No.: US 8,452,083 B2
(45) Date of Patent: May 28, 2013

(54) IMAGE PROCESSING APPARATUS, IMAGE PROCESSING METHOD, AND COMPUTER-READABLE MEDIUM

(75) Inventor: Minoru Kambegawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 142 days.

(21) Appl. No.: 13/153,578

(22) Filed: Jun. 6, 2011

(65) Prior Publication Data

US 2011/0305385 A1    Dec. 15, 2011

(30) Foreign Application Priority Data

Jun. 9, 2010   (JP) ................................. 2010-132412

(51) Int. Cl.
*G06K 9/36*   (2006.01)
(52) U.S. Cl.
USPC ........................................................ 382/162
(58) Field of Classification Search
USPC ............ 382/162, 167, 232; 375/240; 358/1.1, 358/1.9, 1.12, 3.01, 3.13
See application file for complete search history.

(56) References Cited

U.S. PATENT DOCUMENTS

| | | | |
|---|---|---|---|
| 5,539,468 A | 7/1996 | Suzuki et al. | 348/403 |
| 6,243,416 B1 | 6/2001 | Matsushiro et al. | 375/240 |
| 6,731,400 B1 | 5/2004 | Nakamura et al. | 358/1.9 |
| 7,321,693 B2 | 1/2008 | Kadowaki | 382/232 |
| 2008/0259359 A1 | 10/2008 | Tamura | 358/1.1 |
| 2009/0097072 A1 | 4/2009 | Tamura | 358/3.01 |
| 2009/0323132 A1 | 12/2009 | Yano et al. | 358/466 |
| 2010/0128295 A1 | 5/2010 | Tamura | 358/1.12 |
| 2011/0109942 A1 | 5/2011 | Kashibuchi et al. | 358/3.13 |
| 2011/0188750 A1 | 8/2011 | Tamura | 382/167 |

FOREIGN PATENT DOCUMENTS

| | | |
|---|---|---|
| JP | 05-316360 A | 11/1993 |
| JP | 9-244832 A | 9/1997 |
| JP | 10-136179 A | 5/1998 |
| JP | 10-257488 A | 9/1998 |
| JP | 2003-209698 A | 7/2003 |
| JP | 2004-104621 A | 4/2004 |
| JP | 2004-134962 A | 4/2004 |
| JP | 2004-153751 A | 5/2004 |
| JP | 2008-271046 A | 11/2008 |
| JP | 2008-301373 A | 12/2008 |
| JP | 2011-071767 A | 4/2011 |
| JP | 2011-071767 | 7/2011 |

OTHER PUBLICATIONS

U.S. Appl. No. 13/051,141, filed Mar. 18, 2011, Inventor: Toru Ushiku.

*Primary Examiner* — Duy M Dang
(74) *Attorney, Agent, or Firm* — Fitzpatrick, Cella, Harper & Scinto

(57) ABSTRACT

An image processing apparatus comprises: a specification unit configured sequentially to determine, as a processing object, each of the blocks divided, and to compare data types of respective pixels in the block that is the processing object; a first determination unit configured to determine whether pixels included in a block including two data types to L (L=M×N) data types include a single type of attribute data; and an output unit configured to output, based on a determination by the first determination, a flag indicating that the block includes an attribute, a flag indicating a layout pattern of the block, a type of color data and a type of attribute data which are extracted from a pixel at a predefined position in the block.

12 Claims, 14 Drawing Sheets

FIG. 3

| LAYOUT OF IMAGE DATA WITH ATTRIBUTE | NUMBER OF TYPES OF IMAGE DATA WITH ATTRIBUTE AND THEIR POSSIBLE COMBINATIONS | NUMBER OF TYPES OF ATTRIBUTE DATA |
|---|---|---|
| | ONE TYPE (ALL PIXELS HAVE THE SAME TYPE): ONE COMBINATION | ONE TYPE |
| | TWO TYPES: SEVEN COMBINATIONS | ONE TO TWO TYPES |
| | THREE TYPES: SIX COMBINATIONS | ONE TO THREE TYPES |
| | FOUR TYPES: ONE COMBINATION | ONE TO FOUR TYPES |

| LAYOUT OF IMAGE DATA WITH ATTRIBUTE | FLAG |
|---|---|
|  | 0 |
|  | 1 |
|  | 2 |
|  | 3 |
|  | 4 |
|  | 5 |
|  | 6 |
|  | 7 |
|  | 8 |
|  | 9 |
|  | A |
|  | B |
|  | C |
|  | D |
|  | E |
FIG. 4

FIG. 6

| IMAGE | 1-2 bit 0 | 1-3 bit 1 | 1-4 bit 2 | 2-3 bit 3 | 2-4 bit 4 | 3-4 bit 5 | PATTERN FLAG |
|---|---|---|---|---|---|---|---|
| | 1 | 1 | 1 | 1 | 1 | 1 | 0 |
| | 0 | 1 | 1 | 0 | 0 | 1 | 1 |
| | 0 | 0 | 1 | 1 | 0 | 0 | 2 |
| | 0 | 1 | 0 | 0 | 1 | 0 | 3 |
| | 0 | 0 | 0 | 1 | 1 | 1 | 4 |
| | 1 | 0 | 1 | 0 | 1 | 0 | 5 |
| | 1 | 1 | 0 | 1 | 0 | 0 | 6 |
| | 1 | 0 | 0 | 0 | 0 | 1 | 7 |
| | 0 | 1 | 0 | 0 | 0 | 0 | 8 |
| | 0 | 0 | 1 | 0 | 0 | 0 | 9 |
| | 0 | 0 | 0 | 0 | 0 | 1 | A |
| | 0 | 0 | 0 | 1 | 0 | 0 | B |
| | 0 | 0 | 0 | 0 | 1 | 0 | C |
| | 1 | 0 | 0 | 0 | 0 | 0 | D |
| | 0 | 0 | 0 | 0 | 0 | 0 | E |

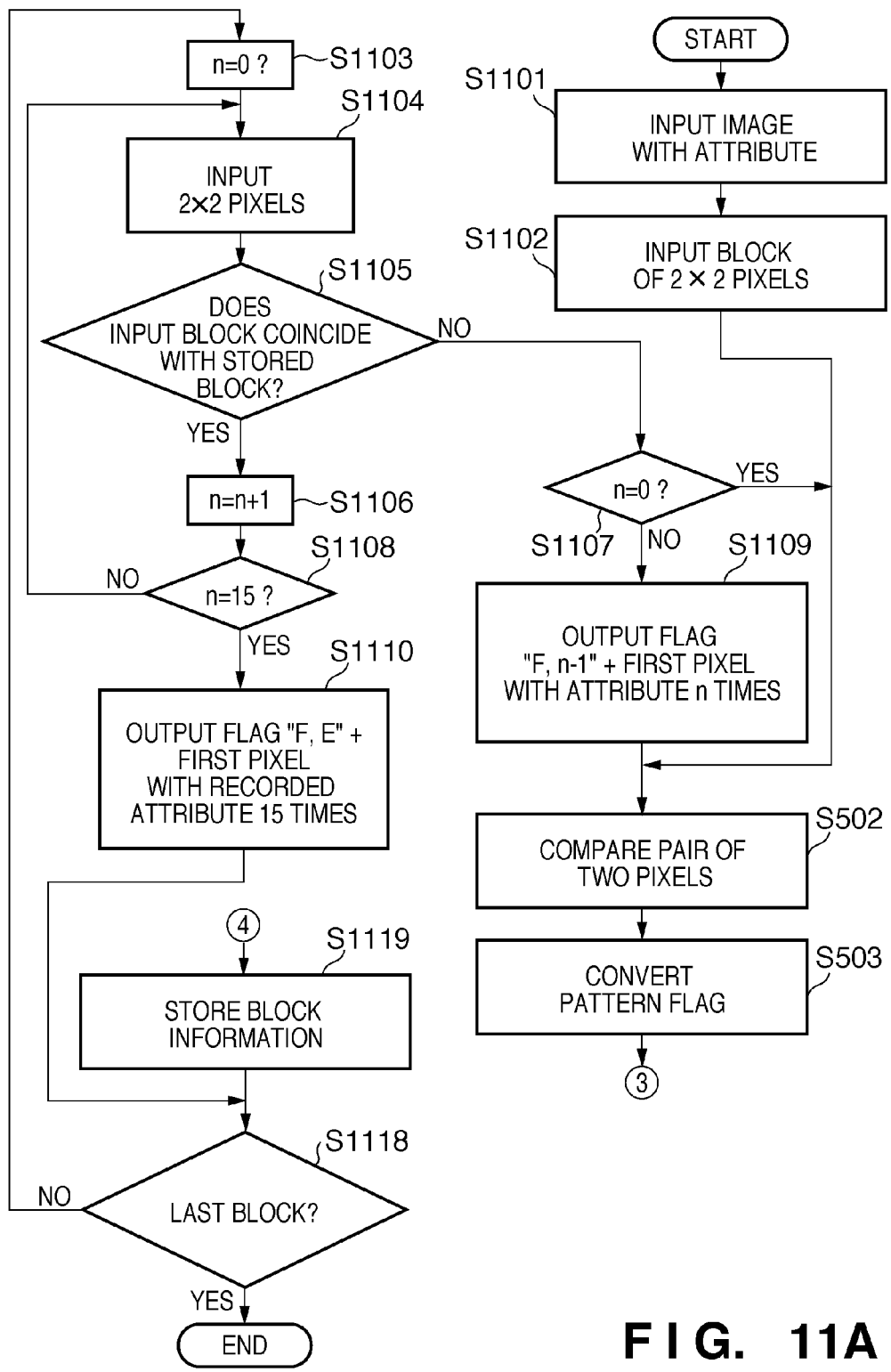
F I G. 11A

IMAGE PROCESSING APPARATUS, IMAGE PROCESSING METHOD, AND COMPUTER-READABLE MEDIUM

BACKGROUND OF THE INVENTION

1. Field of the Invention

The present invention relates to a technique of compressing image data and its attribute data for each predetermined block, and a technique of performing image processing and restoration processing of an image compressed for each block.

2. Description of the Related Art

With an increase in resolution of an image, the number of pixels which require image processing is dramatically increasing, so the processing load is getting heavier. To combat this problem, compression processing is applied to image data to be processed. For example, as color still image compression schemes, a JPEG scheme which uses discrete cosine transformation and a scheme which uses wavelet transformation are widely employed. Encoding schemes of these kinds generally encode an image for each predetermined block (for example, for each unit of 8×8 or 16×16 pixels), and perform discrete cosine transformation, quantization, and entropy coding, thereby attaining high compression efficiency. Because encoding schemes of these kinds use variable-length coding, the code length changes for each image data to be encoded.

When the above-mentioned image compression is used, processing of decoding compressed data becomes necessary to convert each pixel data. In other words, image processing cannot be performed for compressed data intact, so its decoding processing inevitably becomes necessary. This makes it necessary to process all pixels in high-resolution data for each pixel, thus prolonging the processing time.

Also, as compression processing techniques, the known run length encoding scheme of storing pixel data and their run lengths, and a technique of compressing data by reducing the number of colors to two or fewer colors for each block and outputting color data corresponding to two colors and the layout shape of these two colors, as described in Japanese Patent Laid-Open No. 2008-271046, have been disclosed.

In Japanese Patent Laid-Open No. 2008-271046, every block has two colors, and shape information associated with the layout of these two colors and color information of these two colors are stored. However, to achieve a higher image quality and a higher processing speed, the applicant of the present invention proposes a technique of compression without degrading the image quality of a block having data types larger in number than those of two colors in Japanese Patent Application No. 2009-221444. In Japanese Patent Application No. 2009-221444, first, image data is divided into blocks (for example, blocks each including 2×2 pixels), and color data of respective pixels in the same block are compared with each other. Thus, layout pattern information of color data included in the block of interest, and color data information corresponding to the number of colors included in the block of interest, are output. Among the output color data information, first color data information (for example, color data information of the upper left pixel in each block with a size of 2×2 pixels) corresponding to a pixel at a predetermined position in this block and other color data information (second to fourth color data information) are separately stored in different memory areas. That is, the feature of this patent reference lies in that a set of layout pattern information obtained from each block, a set of first color data information, and a set of other color information are stored in different memory areas.

Because each block is more likely to have pixels with the same color, the data stored in the memory area is compressed data with a size smaller than data of the original image. Also, because the first color data information is the pixel value of a pixel at a predetermined position in each block, the first color data information stored in a continuous memory area is equivalent to a low-resolution image generated by simply thinning the original image. Therefore, low-resolution image data can be easily obtained as well. Also, locating low-resolution image data including the first color data information of each block in a continuous memory area facilitates processing of encoded data intact, thus allowing even pixel processing for a low-resolution image without decoding.

SUMMARY OF THE INVENTION

On the other hand, the image data to be processed also includes image data with an attribute in which an attribute is added to each pixel. The present invention makes it possible to efficiently compress such image data with an attribute.

According to one aspect of the present invention, there is provided an image processing apparatus comprising: a division unit configured to divide image data, in which a data type of each pixel is represented by color data and attribute data, into blocks each having a size of M×N pixels; a specification unit configured sequentially to determine, as a processing object, each of the blocks divided by the division unit, and to compare data types of respective pixels in the block that is the processing object, thereby specifying a flag indicating a layout pattern of data types included in each of the blocks; a first determination unit configured to determine whether pixels included in a block including two data types to L (L=M×N) data types include a single type of attribute data; and an output unit configured to output, for a block which includes two data types to L data types and for which the first determination unit determines that pixels included in the block include a single type of attribute data, a flag indicating that the block includes a single attribute, a flag indicating a layout pattern of the block, a first type of color data and a first type of attribute data which are extracted from a pixel at a predefined position in the block, and a second type of color data to an Lth type of color data which are extracted based on the layout pattern of the block, to output, for a block which includes two data types to L data types and for which the first determination unit determines that pixels included in the block include more than one type of attribute data, a flag indicating a layout pattern of the block, a first type of color data and a first type of attribute data which are extracted from a pixel at a predefined position in the block, and a second type of color data to an Lth type of color data and a second type of attribute data to an Lth type of attribute data which are extracted based on the layout pattern of the block, and to output, for a block which includes only one data type, a flag indicating a layout pattern of the block, and a first type of color data and a first type of attribute data which are extracted from a pixel at a predefined position in the block.

According to another aspect of the present invention, there is provided an image processing apparatus comprising: a division unit configured to divide image data, in which a data type of each pixel is represented by color data and attribute data, into blocks each having a size of M×N pixels; a specification unit configured sequentially to determine, as a processing object, each of the blocks divided by the division unit, and to compare data types of respective pixels in the block that is the processing object, thereby specifying a flag indicating a layout pattern of data types included in each of the blocks; a first determination unit configured to determine whether pixels included in a block including two data types to L (L=M×N) data types include a single type of attribute data; and an output unit configured to output, for a block which includes two data types to L data types and for which the first determination unit determines that pixels included in the block include a single type of attribute data, a flag indicating a layout pattern of the block, a first type of color data and a first type of attribute data which are extracted from a pixel at a predefined position in the block, and a second type of color data to an Lth type of color data which are extracted based on the layout pattern of the block, to output, for a block which includes two data types to L data types and for which the first determination unit determines that pixels included in the block include more than one type of attribute data, a flag indicating that the block includes a plurality of attributes, a flag indicating a layout pattern of the block, a first type of color data and a first type of attribute data which are extracted from a pixel at a predefined position in the block, and a second type of color data to an Lth type of color data and a second type of attribute data to an Lth type of attribute data which are extracted based on the layout pattern of the block, and to output, for a block which includes only one data type, a flag indicating a layout pattern of the block, and a first type of color data and a first type of attribute data which are extracted from a pixel at a predefined position in the block.

According to another aspect of the present invention, there is provided an image processing method comprising: a division step of using a division unit to divide image data, in which a data type of each pixel is represented by color data and attribute data, into blocks each having a size of M×N pixels; a specification step of using a specification unit to sequentially determine, as a processing object, each of the blocks divided in the division step, and compare data types of respective pixels in the block that is the processing object, thereby specifying a flag indicating a layout pattern of data types included in each of the blocks; a first determination step of using a first determination unit to determine whether pixels included in a block including two data types to L (L=M×N) data types include a single type of attribute data; and an output step of using an output unit to output, for a block which includes two data types to L data types and for which it is determined in the first determination step that pixels included in the block include a single type of attribute data, a flag indicating that the block includes a single attribute, a flag indicating a layout pattern of the block, a first type of color data and a first type of attribute data which are extracted from a pixel at a predefined position in the block, and a second type of color data to an Lth type of color data which are extracted based on the layout pattern of the block, output, for a block which includes two data types to L data types and for which it is determined in the first determination step that pixels included in the block include more than one type of attribute data, a flag indicating a layout pattern of the block, a first type of color data and a first type of attribute data which are extracted from a pixel at a predefined position in the block, and a second type of color data to an Lth type of color data and a second type of attribute data to an Lth type of attribute data which are extracted based on the layout pattern of the block, and output, for a block which includes only one data type, a flag indicating a layout pattern of the block, and a first type of color data and a first type of attribute data which are extracted from a pixel at a predefined position in the block.

According to another aspect of the present invention, there is provided an image processing method comprising: a division step of using a division unit to divide image data, in which a data type of each pixel is represented by color data and attribute data, into blocks each having a size of M×N pixels; a specification step of using a specification unit to sequentially determine, as a processing object, each of the blocks divided in the division step, and compare data types of respective pixels in the block that is the processing object, thereby specifying a flag indicating a layout pattern of data types included in each of the blocks; a first determination step of using a first determination unit to determine whether pixels included in a block including two data types to L (L=M×N) data types include a single type of attribute data; and an output step of using an output unit to output, for a block which includes two data types to L data types and for which it is determined in the first determination step that pixels included in the block include a single type of attribute data, a flag indicating a layout pattern of the block, a first type of color data and a first type of attribute data which are extracted from a pixel at a predefined position in the block, and a second type of color data to an Lth type of color data which are extracted based on the layout pattern of the block, output, for a block which includes two data types to L data types and for which it is determined in the first determination step that pixels included in the block include more than one type of attribute data, a flag indicating that the block includes a plurality of attributes, a flag indicating a layout pattern of the block, a first type of color data and a first type of attribute data which are extracted from a pixel at a predefined position in the block, and a second type of color data to an Lth type of color data and a second type of attribute data to an Lth type of attribute data which are extracted based on the layout pattern of the block, and output, for a block which includes only one data type, a flag indicating a layout pattern of the block, and a first type of color data and a first type of attribute data which are extracted from a pixel at a predefined position in the block.

According to another aspect of the present invention, there is provided a computer-readable medium storing a program for causing a computer to function as: a division unit configured to divide image data, in which a data type of each pixel is represented by color data and attribute data, into blocks each having a size of M×N pixels; a specification unit configured sequentially to determine, as a processing object, each of the blocks divided by the division unit, and compares data types of respective pixels in the block that is the processing object, thereby specifying a flag indicating a layout pattern of data types included in each of the blocks; a first determination unit configured to determine whether pixels included in a block including two data types to L (L=M×N) data types include a single type of attribute data; and an output unit configured to output, for a block which includes two data types to L data types and for which the first determination unit determines that pixels included in the block include a single type of attribute data, a flag indicating that the block includes a single attribute, a flag indicating a layout pattern of the block, a first type of color data and a first type of attribute data which are extracted from a pixel at a predefined position in the block, and a second type of color data to an Lth type of color data which are extracted based on the layout pattern of the block, to output, for a block which includes two data types to L data types and for which the first determination unit determines that pixels included in the block include more than one type of attribute data, a flag indicating a layout pattern of the block, a first type of color data and a first type of attribute data which are extracted from a pixel at a predefined position in the block, and a second type of color data to an Lth type of color data and a second type of attribute data to an Lth type of attribute data which are extracted based on the layout pattern of the block, and to output, for a block which includes only one data type, a flag indicating a layout pattern of the block, and a first type of color data and a first type of attribute data which are extracted from a pixel at a predefined position in the block.

According to another aspect of the present invention, there is provided a computer-readable medium storing a program for causing a computer to function as: a division unit configured to divide image data, in which a data type of each pixel is represented by color data and attribute data, into blocks each having a size of M×N pixels; a specification unit configured sequentially to determine, as a processing object, each of the blocks divided by the division unit, and compares data types of respective pixels in the block that is the processing object, thereby specifying a flag indicating a layout pattern of data types included in each of the blocks; a first determination unit configured to determine whether pixels included in a block including two data types to L (L=M×N) data types include a single type of attribute data; and an output unit configured to output, for a block which includes two data types to L data types and for which the first determination unit determines that pixels included in the block include a single type of attribute data, a flag indicating a layout pattern of the block, a first type of color data and a first type of attribute data which are extracted from a pixel at a predefined position in the block, and a second type of color data to an Lth type of color data which are extracted based on the layout pattern of the block, to output, for a block which includes two data types to L data types and for which the first determination unit determines that pixels included in the block include more than one type of attribute data, a flag indicating that the block includes a plurality of attributes, a flag indicating a layout pattern of the block, a first type of color data and a first type of attribute data which are extracted from a pixel at a predefined position in the block, and a second type of color data to an Lth type of color data and a second type of attribute data to an Lth type of attribute data which are extracted based on the layout pattern of the block, and to output, for a block which includes only one data type, a flag indicating a layout pattern of the block, and a first type of color data and a first type of attribute data which are extracted from a pixel at a predefined position in the block.

According to the present invention, it is possible to reduce the amount of held data when image data with an attribute is compressed and held.

Further features of the present invention will become apparent from the following description of exemplary embodiments with reference to the attached drawings.

BRIEF DESCRIPTION OF THE DRAWINGS

FIG. 3 is a view showing a list of patterns of blocks obtained upon dividing an image into blocks;

FIG. 4 is a view showing a list of patterns of blocks and their identifiers;

FIG. 6 is a view showing the process of converting the patterns of blocks into flags;

FIGS. 11A and 11B are flowcharts showing the sequence of image compression according to the third embodiment;

DESCRIPTION OF THE EMBODIMENTS

First Embodiment

Figure 1:
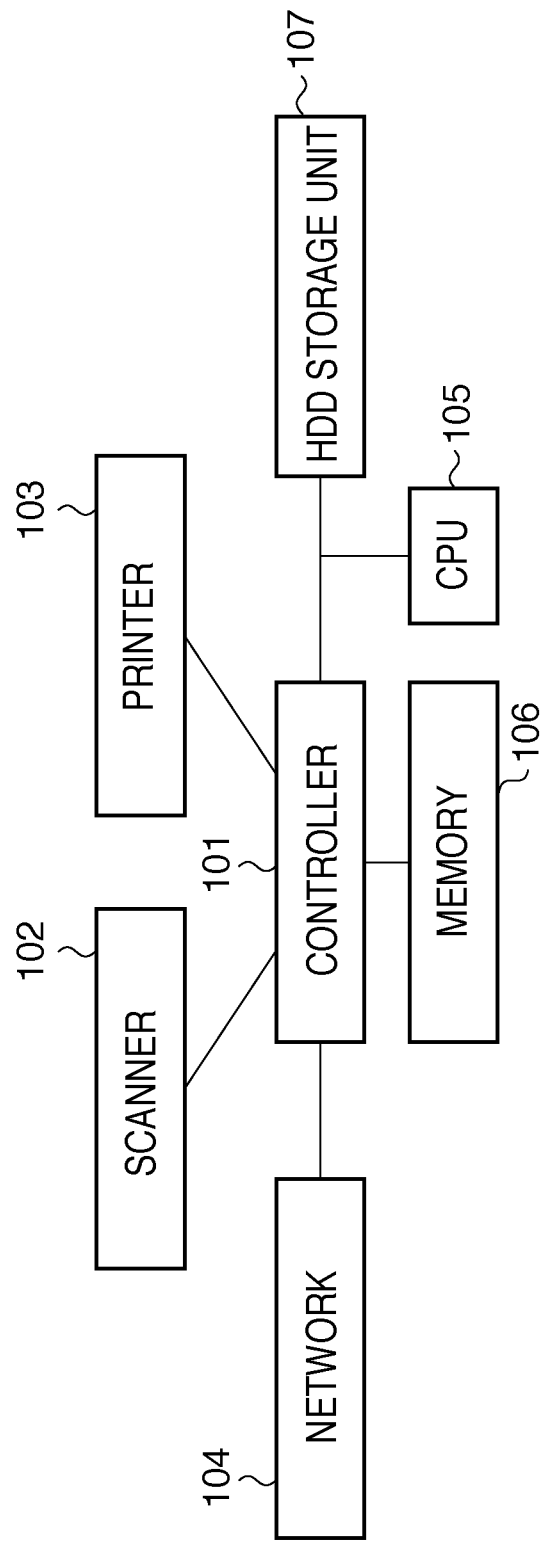
FIG. 1 is a block diagram showing an overview of an MFP system.

FIG. 1 is a block diagram showing the overall configuration of a digital multifunctional system (to be abbreviated as an MFP (Multi-Function Peripheral) hereinafter) which exemplifies an image processing apparatus according to an embodiment of the present invention and scans, prints, and copies. A controller 101 is connected to a scanner 102 serving as an image input device and a printer 103 serving as an image output device. On the other hand, the controller 101 is also connected to a network 104 such as a LAN (Local Area Network) or a public line (WAN: Wide Area Network) to input/output image information or device information and perform image expansion of PDL (Page Description Language) data. A CPU (Central Processing Unit) 105 serves as a processor which controls the overall system. A memory 106 serves as a system working memory for operating the CPU 105, and also serves as an image memory for temporarily storing image data. An HDD storage unit 107 serves as a hard disk drive and stores system software and various types of data such as image data.

Attribute data to be processed in this embodiment will be described herein. An attribute is often assigned to each pixel included in image data. Examples of assignable types of attributes include text, a photo, graphics, a background, and gray compensation. By selectively performing image processing suitable for each type of attribute data for image data assigned with such an attribute, optimum image data can be obtained. For example, it is possible to perform processing for increasing the contrast to improve the readability of a pixel assigned with a text attribute, and perform processing for realizing excellent grayscale reproduction for a pixel assigned with a photo attribute. In the following description, image data with assigned attribute data will be referred to as "image data with an attribute" and image data with no attribute data will be simply referred to as "image data".

Figure 2:
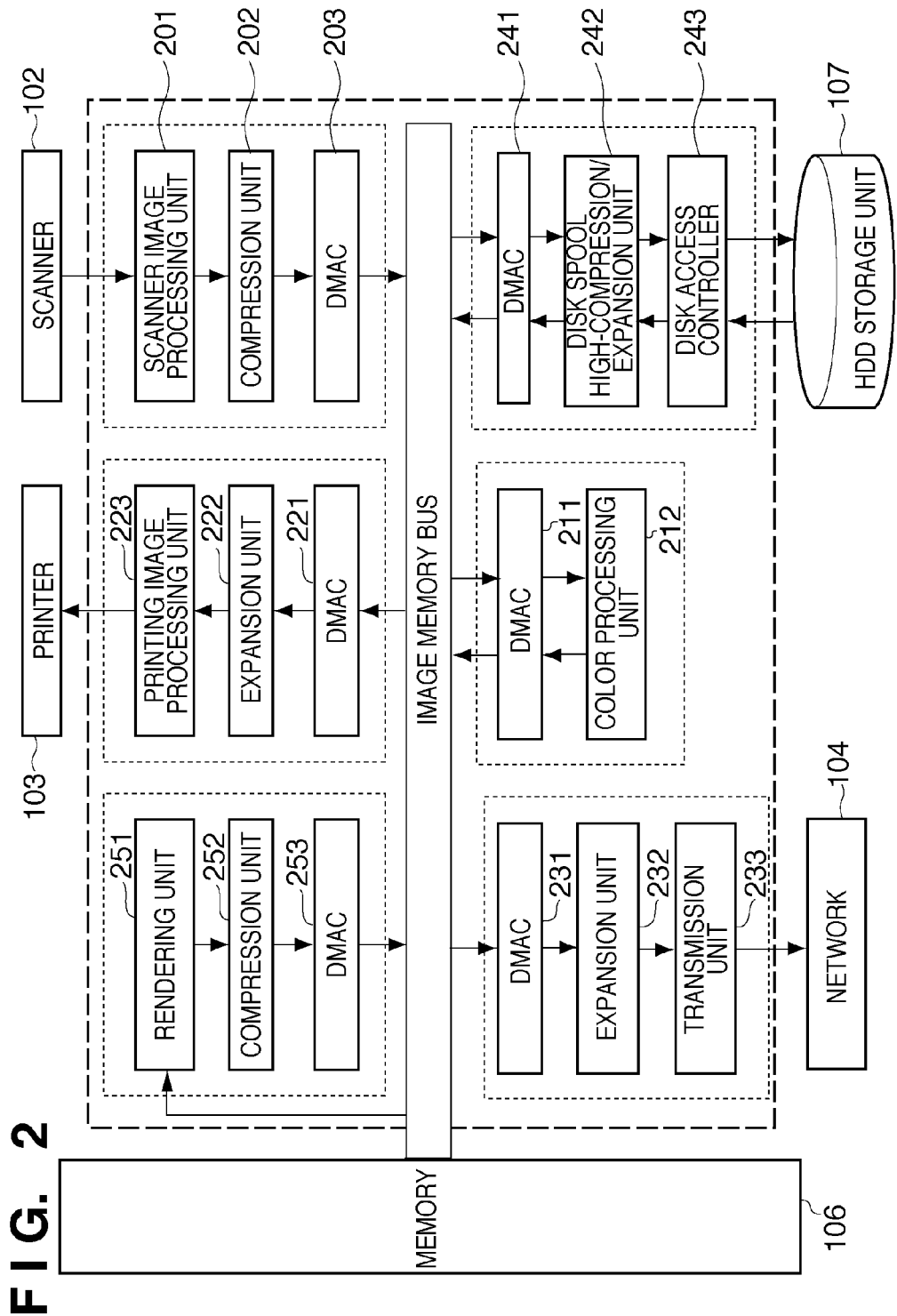
FIG. 2 is a block diagram showing an overview of a controller.

The operation of the controller 101 shown in FIG. 1 will be described in detail with reference to FIG. 2. In this case, scanned data is read. In the controller unit having received read image data of three colors R, G, and B (Red, Green, and Blue) from the scanner 102, first, a scanner image processing unit 201 performs image processing such as shading processing and filter processing for the image data, and thereupon attribute data is added to the processed image data. A compression unit 202 performs image compression processing for the image data with an attribute. The compressed data is stored in the memory 106 via a DMAC (Direct Memory Access Controller) 203.

In printing the scanned data, the compressed data stored in the memory 106 is input to a color processing unit 212 via a DMAC 211, and converted into data in a CMYK (Cyan, Magenta, Yellow, and Black) color space. Attribute data is also restored from the above-mentioned compressed data. The C, M, Y, and K values of the converted data undergo color processing for adjustment in, for example, printer gamma correction and density adjustment, which are optimum for its attribute, and thereupon the processed data is stored again in the memory 106 via the DMAC 211. To perform image processing for printing, the compressed data stored in the memory 106 is read via a DMAC 221 and expanded into raster image data with an attribute by an expansion unit 222. The raster CMYK image data is input to a print image processing unit 223, undergoes area coverage modulation processing, which is optimum for the attribute assigned to this image data and uses the dither method or the error diffusion method, by the print image processing unit 223, and is output to the printer 103.

In transmitting the scanned data to the network 104, the compressed data stored in the memory 106 is input to the color processing unit 212 via the DMAC 211, and undergoes color conversion. More specifically, the compressed data undergoes, for example, display gamma adjustment and sheet self-color adjustment which are optimum for its attribute, and is thereupon converted into data in YCbCr (luminance, blue color difference, and red color difference) color space. The converted data is stored again in the memory 106 via the DMAC 211. To perform image processing for transmission, the compressed data stored in the memory 106 is read via a DMAC 231 and expanded into raster image data with an attribute by an expansion unit 232. A transmission unit 233 performs JPEG compression processing for the raster YCbCr image data in case of color image transmission. In contrast, the transmission unit 233 performs JBIG compression processing for the raster YCbCr image data by binarizing its Y data in case of monochrome binary image transmission. After that, the controller 101 outputs the compressed data to the network 104.

In storing the scanned data, the compressed data stored in the memory 106 is input to a disk spool high-compression/expansion unit 242 via a DMAC 241. The disk spool high-compression/expansion unit 242 has a writing speed on the HDD that is slower than that on the memory, and therefore performs JPEG compression at a higher compression ratio. The compressed data is stored in the HDD storage unit 107 via a disk access controller 243. To expand the stored data in the memory 106 again, processing reverse to the above-mentioned processing is performed.

A case in which PDL data is written on the memory will be described below. Although not shown in FIG. 2, PDL data sent via the network 104 in FIG. 1 is interpreted using the CPU 105, and a display list obtained with this processing is output to the memory 106. A rendering unit 251 renders the display list stored in the memory 106 into RGB image data with an attribute, and a compression unit 252 performs its image compression processing. The compressed data is stored in the memory 106 via a DMAC 253. The PDL image data can be printed, transmitted to the network, and stored by processing similar to that for the scanned image data.

[Compression Processing]

The compression unit for image data with an attribute as a feature of the present invention will be described in detail hereinafter. First, image data with an attribute for each page is divided into blocks each including a predetermined number of pixels (2×2 pixels in this embodiment), and these blocks are sequentially determined as blocks of interest to compress the data. Note that each pixel of the image data with an attribute in this embodiment includes R (Red), G (Green), and B (Blue) data each with 8 bits and attribute data with 8 bits.

Before a description of processing, the layout patterns of data types in a block of 2×2 pixels (data of four pixels) will be considered. The data type of each pixel is represented by a total of 32 bits of the R, G, and B data and attribute data, each pair of pixels are compared using 32 bits as a unit, and it is determined that these two pixels have the same data type if their comparison results coincide with each other. A block includes four pixels, so one to four data types occupy the block. The number of possible pattern combinations of one to four data types will be explained with reference to FIG. 3. In this specification, pieces of information of one to four data types in output data will be referred to as first, second, third, and fourth types of image data (with attributes), respectively.

First, when the block has only one data type, the four pixels have the same data type, so only one combination of data types exists. A case in which the block has two data types will be considered next. When two types of data are laid out in the four pixels, the type of image data with an attribute of a pixel at a predefined position (the upper left pixel in this case) is defined as a first type, and the remaining type of image data with an attribute, which is different from the first type, is defined as the second type. In this case, the first or second type is assigned to the three remaining pixels other than the upper left pixel, so a total of seven combinations are possible upon excluding a combination when the four pixels have the same data type.

A case in which the block has three data types will be considered. When three types of data are laid out in the four pixels, one of the three types is used twice in the block, so the number of combinations of data types when the coordinate positions of two out of the four pixels have the same data type need only be obtained. In other words, in case of three data types, two coordinate positions are selected from the four coordinate positions, so a total of six combinations are possible. Lastly, when the block has four data types, only one combination exists.

A total of 15 patterns are possible upon counting up the number of combinations of data types in all these cases of one to four data types. Considering that flags are assigned to all these patterns to identify them, 4 bits are necessary as the amount of data. This takes place, as shown in FIG. 4, and the flags used to identify the patterns of data types will be referred to as "pattern flags" hereinafter. The number and layout pattern of data types included in the block can be specified based on the thus defined pattern flag. Note that "F" is not used as a 4-bit pattern flag in this case.

In this embodiment, processing is changed in accordance with whether a block of 2×2 pixels includes one or a plurality of types of attribute data. The number of possible types of attribute data is equal to or smaller than that of possible types of image data with an attribute, as shown in FIG. 3. In this embodiment, 4-bit identification flag "F", which is not assigned in the pattern flag shown in FIG. 4, is additionally assigned if two or more data types are included in image data with an attribute in four pixels, and only one type of attribute data is included in this image data. This pattern flag "F" will be referred to as single attribute identification flag "F" hereinafter.

[Sequence of Processing]

Figure 5:
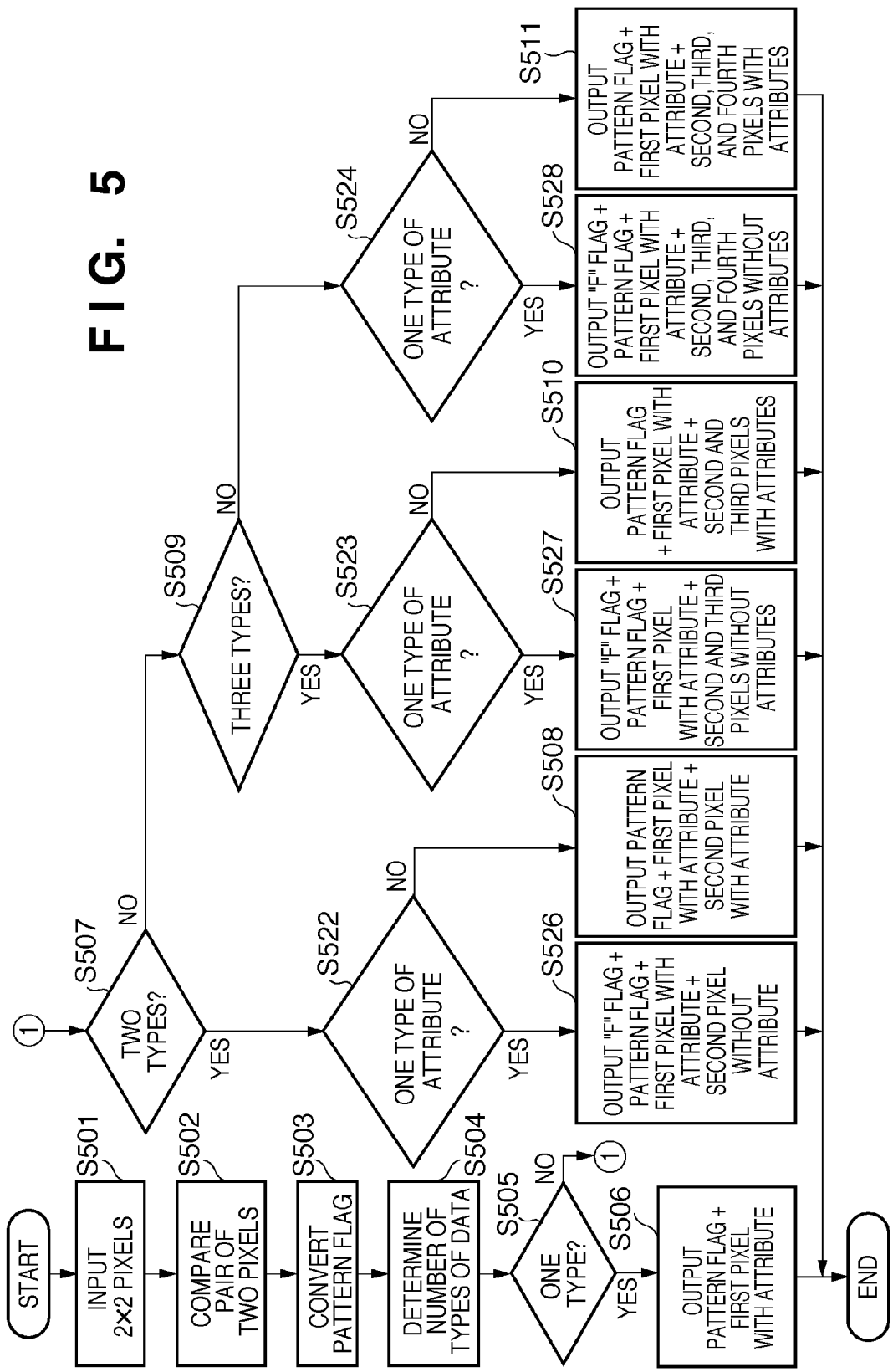
FIG. 5 is a flowchart showing the sequence of image compression according to the first embodiment.

Processing by the compression units 202 and 252 will be described with reference to a sequence shown in FIG. 5 in consideration of possible combinations of 2×2 pixels as mentioned above. In the following description, an image having, for example, R, G, and B (Red, Green, and Blue) data each with 8 bits and 256 gray levels and attribute data with 8 bits is used as an input, as described earlier. Also, image data with an attribute having 32 bits for each pixel in a dot sequential system of 8-bit data is used as data.

First, the compression unit divides image data with an attribute into blocks each including 2×2 pixels, and sequentially inputs the divided blocks each including 2×2 pixels (S501). The compression unit compares the values of the image data with an attribute (color data and attribute data) of each pair of pixels, each of which are represented by 32 bits, for all combinations of two pixels in the input block (S502). If it is determined as a result of this comparison that all the bits coincide with each other, the compression unit outputs "1"; otherwise, it outputs "0". As shown in FIG. 6, assuming that the upper left, upper right, lower left, and lower right pixels of 2×2 pixels have coordinate positions 1, 2, 3, and 4, respectively, a total of six sets of two pixels 1-2, 1-3, 1-4, 2-3, 2-4, and 3-4 exist. Hence, six comparisons must be made, so 6-bit data is output as the overall comparison results. For example, if all of the four pixels have the same values (all these pixels have the same values of the image data with an attribute (color data and attribute data), the compression unit outputs "1"s as all comparison results; or conversely, if all of the four pixels have different pixel values (all these pixels have different values of the image data with an attribute (color data and attribute data), the compression unit outputs "0"s as all comparison results. As described earlier, 15 patterns may occur in each block including 2×2 pixels, so the compression unit converts the 6-bit comparison results into a 4-bit pattern flag indicating the layout pattern, as shown in FIG. 6 (S503).

Figure 7:
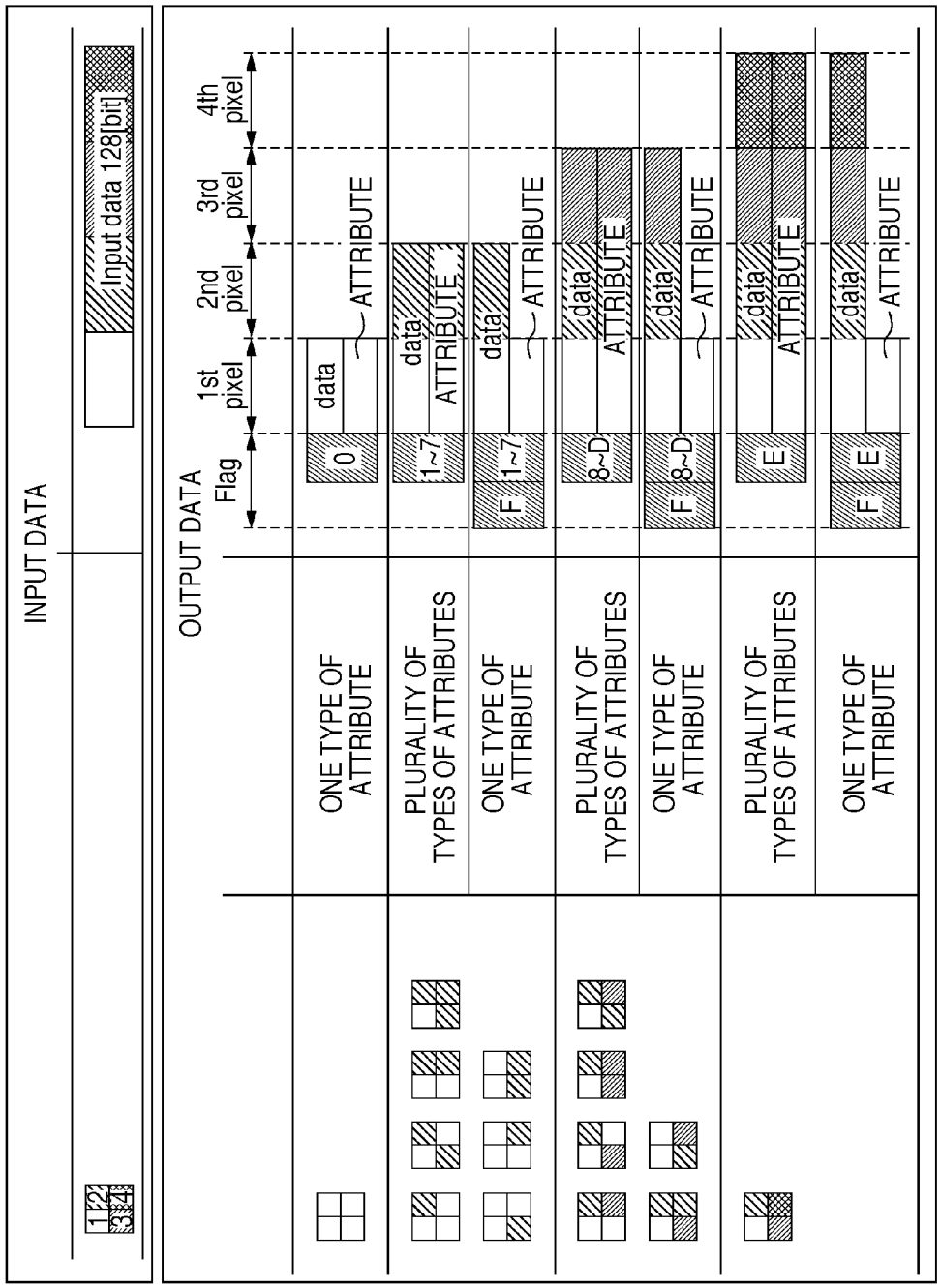
FIG. 7 is a view showing the relationship between the input and output upon compression processing according to the first embodiment.

After the conversion into a 4-bit pattern flag, the number of data types that have occurred in the four pixels is determined from the pattern flag (S504). A pattern indicating the layout of respective values (respective data types) in each block is associated with a 4-bit pattern flag (or 6-bit comparison results), as shown in FIG. 6. Hence, the number of data types in each block and these data types (image data with an attribute, that is, R, G, and B color data and attribute data) of this block can be extracted. In this embodiment, the pattern flag is defined such that the values of the upper left pixel represent a first type of data (first data) for all patterns, and the locations where second and subsequent types of data are stored are also defined in advance for each pattern (see FIG. 4). Therefore, assuming that the upper left pixel (the values of the color data and attribute data of the upper left pixel) has a first type of data, the location of second and subsequent types of data can be obtained based on the pattern flag indicating the layout pattern. The processes in steps subsequent to step S504 will be described with reference to FIG. 7. If it is confirmed that, for example, the four pixels have only one type of data (YES in step S505), the compression unit extracts the data type of the upper left pixel (the values of the color data and attribute data of the upper left pixel) as a first type of data. In this case, none of second and subsequent types of data exist, so the compression unit outputs the pattern flag (4 bits) indicating the layout pattern and the first type of data (32 bits) (S506).

Also, in this embodiment, if the four pixels have two or more types of data, the compression unit determines whether all of the four pixels have the same attribute data, and changes data to be output, in accordance with the determination result. That is, if it is confirmed that the four pixels have two types of data (YES in step S507), the compression unit further determines whether the four pixels have only one type of attribute (whether these pixels have the same attribute) (S522). If it is determined that the four pixels in the block have a plurality of types of attributes (NO in step S522), the compression unit decides the position coordinates of a pixel having a second type of image data with an attribute among the four pixels, based on the pattern flag. The compression unit extracts the data type of the upper left pixel (the values of the color data and attribute data of the upper left pixel) as a first type of data, and further extracts a second type of image data with an attribute (color data and attribute data) from the pixel at the decided position. The compression unit outputs 4 bits of the pattern flag indicating the layout pattern, 32 bits of the first type of image data with an attribute, and 32 bits of the second type of image data with an attribute (S508).

On the other hand, if it is determined that the block has only one type of attribute (YES in step S522), the compression unit outputs single attribute identification flag "F" (4 bits) and 4 bits of the pattern flag indicating the layout pattern as pattern flags. The compression unit further outputs 32 bits of a first type of image data with an attribute and 24 bits of a second type of image data (the latter data has only color data without attribute data) (S526). Note that by outputting single attribute identification flag "F", together with the pattern flag indicating the layout pattern, it is determined that all the pixels included in the block have the same attribute. Therefore, attribute data included in a first type of image data with an attribute can also be used as attribute data for other data types in data expansion. That is, in this embodiment, if a single attribute identification flag "F" is assigned, a second type of data is output without assigning attribute data to it. This configuration suppresses redundant output of attribute data.

If it is confirmed that the four pixels have three types of data (YES in step S509), the compression unit further determines whether the four pixels have only one type of attribute (whether these pixels have the same attribute) (S523). If it is determined that the four pixels have a plurality of types of attributes (2 to L types of attributes; L=4 in this embodiment), the compression unit decides the positions of pixels having second and third types of image data with attributes, based on the pattern flag obtained in step S503. The compression unit extracts the second and third types of image data with attributes based on the decided positions. The compression unit outputs 4 bits of the pattern flag indicating the layout pattern, 32 bits of the first type of image data with an attribute, 32 bits of the second type of image data with an attribute, and 32 bits of the third type of image data with an attribute (S510). On the other hand, if it is determined that the four pixels have only one type of attribute (YES in step S523), the compression unit outputs single attribute identification flag "F" (4 bits) and 4 bits of the pattern flag indicating the layout pattern as pattern flags. The compression unit further outputs 32 bits of a first type of image data with an attribute, 24 bits of a second type of image data (without attribute data), and 24 bits of a third type of image data (without attribute data) (S527). If single attribute identification flag "F" is assigned, second and third types of data are output without assigning attribute data to them, thereby suppressing redundant output of attribute data.

If it is confirmed that the four pixels have four types of data (NO in step S509), the compression unit further determines whether the four pixels have only one type of attribute (whether these pixels have a single attribute) (S524). A first determination unit is thus implemented. If it is determined that the four pixels have a plurality of types of attributes (NO in step S524), the compression unit decides the position coordinates of pixels having second to fourth types of image data with attributes among the four pixels, based on the pattern flag. The compression unit outputs 4 bits of the pattern flag indicating the layout pattern, 32 bits of a first type of image data with an attribute, 32 bits of a second type of image data with an attribute, 32 bits of a third type of image data with an attribute, and 32 bits of a fourth type of image data with an attribute (S511). On the other hand, if it is determined that the four pixels have only one type of attribute (YES in step S524), the compression unit outputs 4 bits of single attribute identification flag "F" and 4 bits of the pattern flag indicating the layout pattern as pattern flags. The compression unit further outputs 32 bits of a first type of image data with an attribute, 24 bits of a second type of image data (without attribute data), 24 bits of a third type of image data (without attribute data), and 24 bits of a fourth type of image data (without attribute data) (S528). If single attribute identification flag "F" is assigned, second to fourth types of data are output without assigning attribute data to them, thereby suppressing redundant output of attribute data. By dividing input image data with an attribute into blocks each including 2×2 pixels, and repeating the above-mentioned series of processes (S501 to S528) upon sequentially determining the divided blocks each including 2×2 pixels as processing objects, compressed data is obtained.

As described above, if the block has more than one attribute data, the compression unit converts input data with 128 bits (4 pixels×32 bits) in a block of 2×2 pixels into a pattern flag (4 bits) indicating the layout pattern in the block and image data with attributes (32 to 128 bits) corresponding to the number of data types included in the block, and outputs them. However, if the block has single attribute data (one type of attribute data), the compression unit adds single attribute identification flag "F" to allow identification, without outputting attribute data for second to fourth types of image data. That is, if the block has single attribute data (one type of attribute data), the compression unit converts input data into a single attribute identification flag (4 bits), a pattern flag (4 bits) indicating the layout pattern, a first type of image data with an attribute (32 bits), and second to fourth types of image data (24 to 72 bits) without attribute data, and outputs them.

Respective pixels in a block of 2×2 pixels have the same values (that is, have both identical R, G, and B color data and attribute data) in many cases, or they have different R, G, and B data but identical attribute data in many other cases. Therefore, processing as mentioned above allows data compression which is efficient and effective in terms of the entire input image.

[Data Structure]

Figure 8:
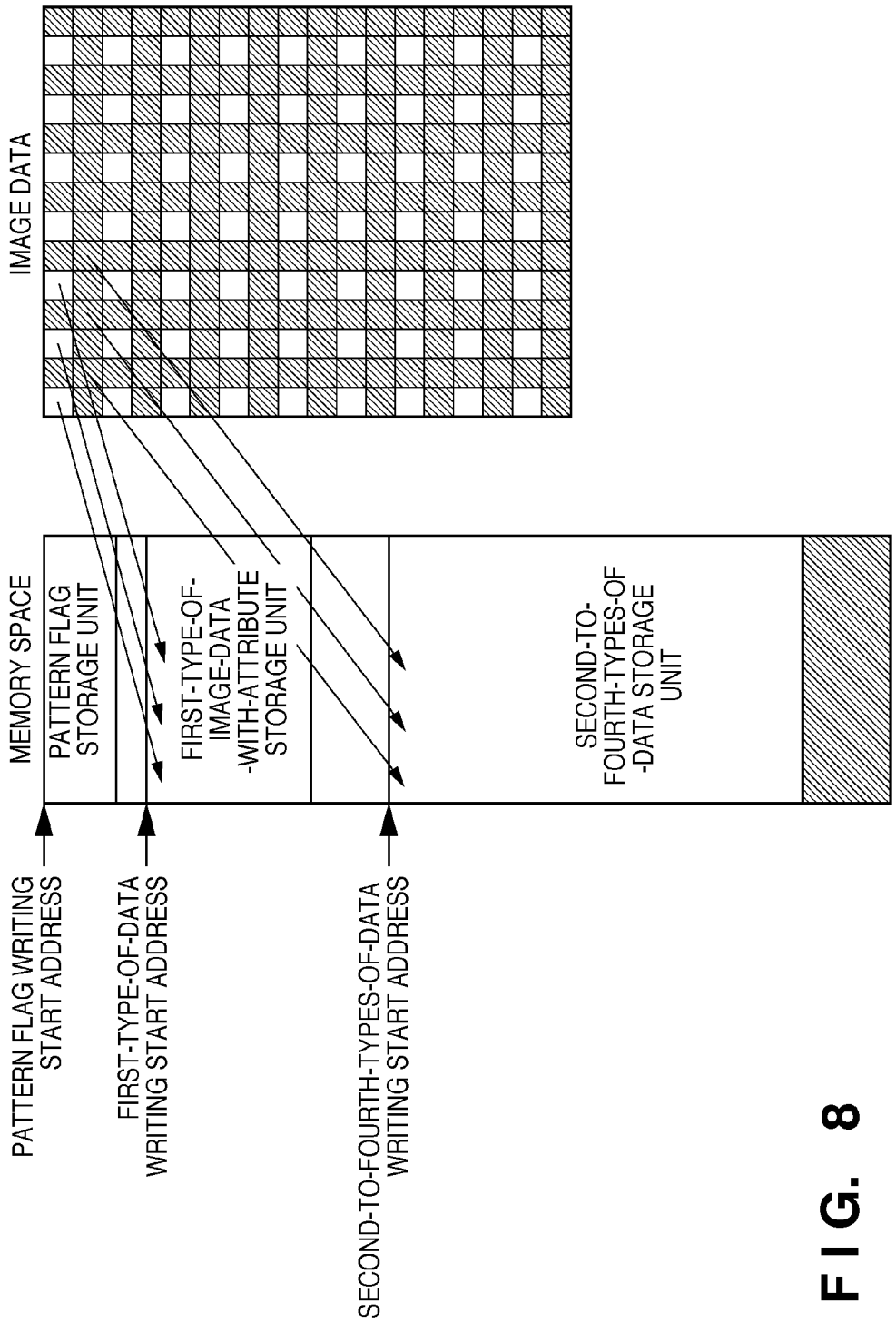
FIG. 8 is a view showing the layout of compressed data on a memory space according to the first embodiment.

As described above, pattern flags (a single attribute identification flag and a pattern flag indicating the layout pattern), a first type of image data with an attribute, and second to fourth types of data (image data with or without attributes), which are sequentially output for each block, are written on the memory 106 via the DMAC. At this time, the DMAC changes the writing positions of the pattern flags, first type of image data with an attribute, and second to fourth types of data. Three addresses: the memory start address for writing pattern flags, that for writing the first type of image data with an attribute, and that for writing the second to fourth types of data are designated on the DMAC. FIG. 8 illustrates these addresses. Pattern flags (single attribute identification flags and pattern flags indicating the layout patterns) of blocks each including 2×2 pixels are sequentially stored in a pattern flag storage unit in a specific order of coordinate position of the block. At this time, a single attribute identification flag and a flag indicating the layout pattern are stored for a block determined to have a single attribute, and only a flag indicating the layout pattern is stored for a block determined to have a plurality of attributes. Image data with an attribute of pixels at predetermined positions (for example, the upper left positions) in blocks each including 2×2 pixels are stored in a first-type-of-image-data-with-attribute storage unit (first-type-of-data storage unit) in a specific order of coordinate position of the block, without encoding or quantization for each pixel. Second to fourth types of data in blocks each including 2×2 pixels are stored in a second-to-fourth-types-of-data storage unit (second-to-Lth-types-of-data storage unit). At this time, second to fourth types of image data (without attribute data) are stored for a block determined to have a single attribute, and second to fourth types of image data with attributes are stored for a block determined to have a plurality of attributes.

The data stored in the first-type-of-image-data-with-attribute storage unit is equivalent to data representing an image with a resolution half that of the original input image. Therefore, to perform processing which requires no high-resolution image, the data stored in the first-type-of-image-data-with-attribute storage unit need only be used. In this manner, when the data stored in the first-type-of-image-data-with-attribute storage unit is used, there is no need to refer to the pattern flag in processing which is completed by one pixel input/output, such as color data or attribute data conversion which uses an LUT, gamma correction processing, and type space conversion processing which uses a matrix operation. Therefore, these types of processing can be directly performed for the data stored in the first-type-of-image-data-with-attribute storage unit. The color processing unit 212 shown in FIG. 2 reads pixel data at addresses subsequent to the first-type-of-data writing start address on the memory 106 via the DMAC 211, and writes it again on the memory 106 after processing for each pixel. At this time, if the number of bits of each pixel remains the same upon a given type of processing for each pixel, the memory capacity can be saved by overwriting the processed data at the same location in the memory 106.

Directly using compressed data in this way, the transfer efficiency on a memory bus improves, and data with pixels fewer than the original image is processed, thus allowing high-speed processing.

That is, upon discretely storing image data on the memory, as shown in FIG. 8, the image results obtained by sampling pixels at the upper left coordinate positions in blocks each including 2×2 pixels of the image data continuously exist on the memory only in the first-type-of-image-data-with-attribute storage unit. The MFP described in this embodiment also has functions such as preview display of accumulated PDL image data and scanned image data, and the above-mentioned network transmission. For example, even if the print resolution is 600 dpi, the preview display and transmission normally do not require such a high resolution but require only a resolution of 300 dpi or less in many cases. When reduced data used in such cases needs to be obtained, a raster image with a half size can be easily obtained by processing only a first type of image data with an attribute while discarding pattern flags and second to fourth types of data.

Reduction transmission when, for example, 600-dpi image data is accumulated in the above-mentioned example will be described. If a resolution higher than a sampled resolution of 300 dpi such as 400 dpi is designated, compressed data, including pattern flags, is expanded once, scaled using a known method, and transmitted. Conversely, if a transmission resolution lower than 300 dpi is designated, scaling processing to the designated resolution is performed using only the data in the first-type-of-image-data-with-attribute storage unit. In this way, data reading is performed while switching the resolution in accordance with the required image size.

[Expansion Processing]

The expansion units 222 and 232 paired with the compression units will be described next. The expansion unit performs processing (decoding processing) of restoring compressed data to the original raster image data, based on pattern flags and pixel data, as mentioned above. Three addresses: the pattern flag writing start address, the first-type-of-data writing start address, and the second-, third-, and fourth-types-of-data writing start address of the compressed data arranged on the memory as shown in FIG. 8 are designated on the DMAC. The DMAC reads out data from the three addresses, and transfers them to the expansion unit.

Figure 13:
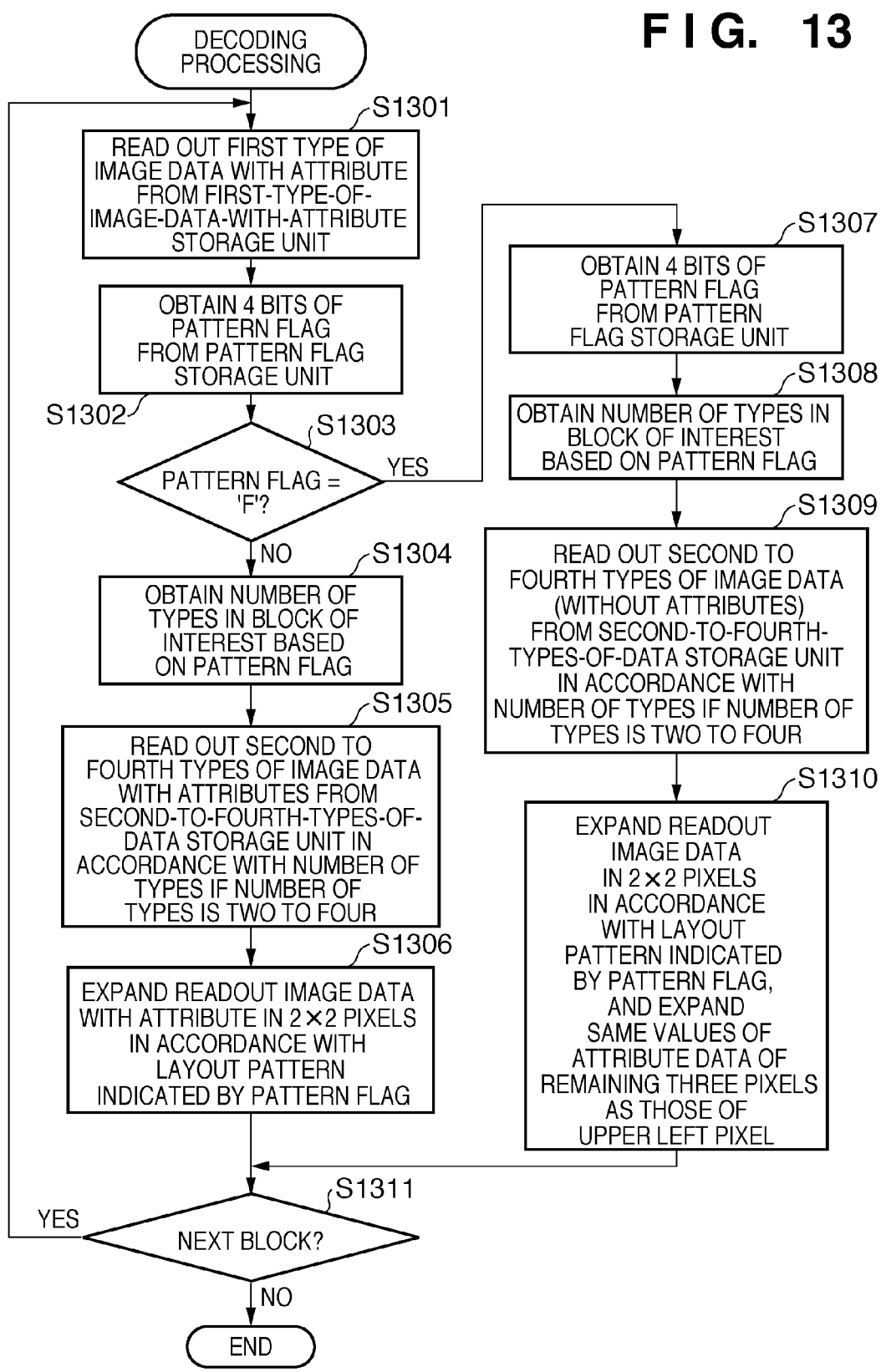
FIG. 13 is a flowchart showing the sequence of expansion processing.

FIG. 13 is a flowchart showing expansion processing executed by the expansion unit. The processes in steps S1301 and S1311 are repeatedly executed for compressed data to be expanded upon sequentially determining blocks each including 2×2 pixels as expansion objects in turn from the first block of 2×2 pixels. When decoding processing starts, a first type of image data with an attribute is read out from the first-type-of-image-data-with-attribute storage unit in step S1301. First, image data placed in the upper left pixel of the first block of 2×2 pixels is read out.

In step S1302, a pattern flag with 4 bits is read out from the pattern flag storage unit. In step S1303, it is determined whether the flag read out in step S1302 is "F". That is, in step S1303, it is determined whether the block has a single attribute. If it is determined in step S1303 that the pattern flag is not "F" (the block has more than one attribute) (NO in step S1303), the pattern flag read out in step S1303 indicates a given layout pattern, so the number of data types included in the block is obtained based on the layout pattern defined for the pattern flag in advance (S1304). If the number of data types is 2 to 4, the expansion unit reads out image data with attributes equal in number to the obtained number of data types from the second-to-fourth-types-of-data storage unit (S1305). If the number of data types is "1", the block has no second to fourth types of data, so readout processing in step S1305 is omitted. The expansion unit maps (expands), in the block to be expanded, the image data with attributes read out in steps S1301 and S1305, based on the layout pattern defined for the pattern flag in advance (S1306). After that, the process advances to step S1311.

On the other hand, if it is determined in step S1303 that the pattern flag is "F" (the block has a single attribute) (YES in step S1303), the expansion unit reads out the next pattern flag with 4 bits from the pattern flag storage unit (S1307). The expansion unit obtains the number of data types included in the block, based on the layout pattern defined in advance for the pattern flag obtained in step S1307 (S1308). If the number of data types is 2 to 4, the expansion unit reads out image data (without attributes) equal in number to the obtained number of data types from the second-to-fourth-types-of-data storage unit (S1309). The expansion unit maps, in the block to be expanded, the first type of image data with an attribute read out in step S1301 and the image data without attributes read out in step S1309, based on the layout pattern defined for the pattern flag in advance (S1310). At this time, the expansion unit expands, in all pixels in the block, the attribute data assigned to the first type of image data with an attribute read out in step S1301. The process then advances to step S1311.

In step S1311, the expansion unit determines whether the next block to be expanded remains. If the next block to be expanded remains (YES in step S1311), the process returns to step S1301; otherwise, if it is determined that all blocks have already been expanded (NO in step S1311), the expansion processing ends.

If an image with a resolution half that of the original image is necessary, the expansion unit requires neither pattern flags nor second to fourth types of data, as described earlier. Therefore, only the first-type-of-data writing start address is designated on the DMAC, and only the first type of data is read from the memory, thereby forming an image. This makes it possible to save the memory bus bandwidth.

Although the value of the upper left pixel is defined as a first type of data in this embodiment, the present invention is not limited to this, and the layout pattern may be defined such that the value of another pixel (for example, the lower right pixel) is defined as a first type of data. Also, although an input image is divided into blocks each including 2×2 pixels (a total of four pixels) in this embodiment, the present invention is not limited to this, and an input image may be divided into blocks each including M×N pixels (a total of L pixels). When the block size is changed, the number of bits of a pattern flag also changes from a length of 4 bits, as a matter of course. Moreover, although data having R, G, and B data each with 8 bits has been taken as an example of color data in this embodiment, data represented by a CMYK color space, grayscale data, or data having pixel values other than 8 bits may be adopted.

Second Embodiment

In the first embodiment, identification flag "F" is added when the block has only one type of attribute data. In contrast to this, in the second embodiment to be described below, identification flag "F" is added when the block has a plurality of types of attribute data.

Figure 9:
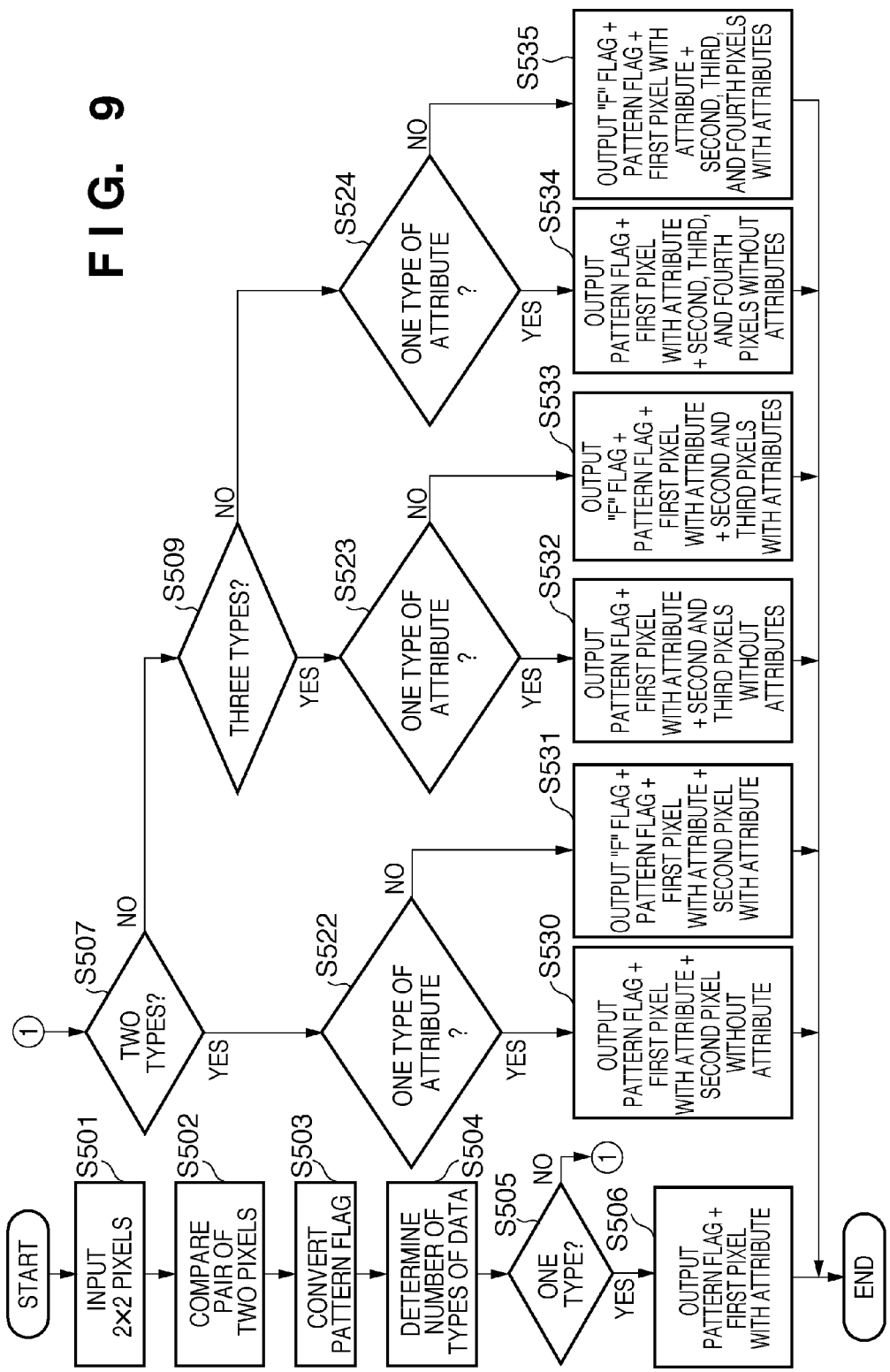
FIG. 9 is a flowchart showing the sequence of image compression according to the second embodiment.
Figure 10:
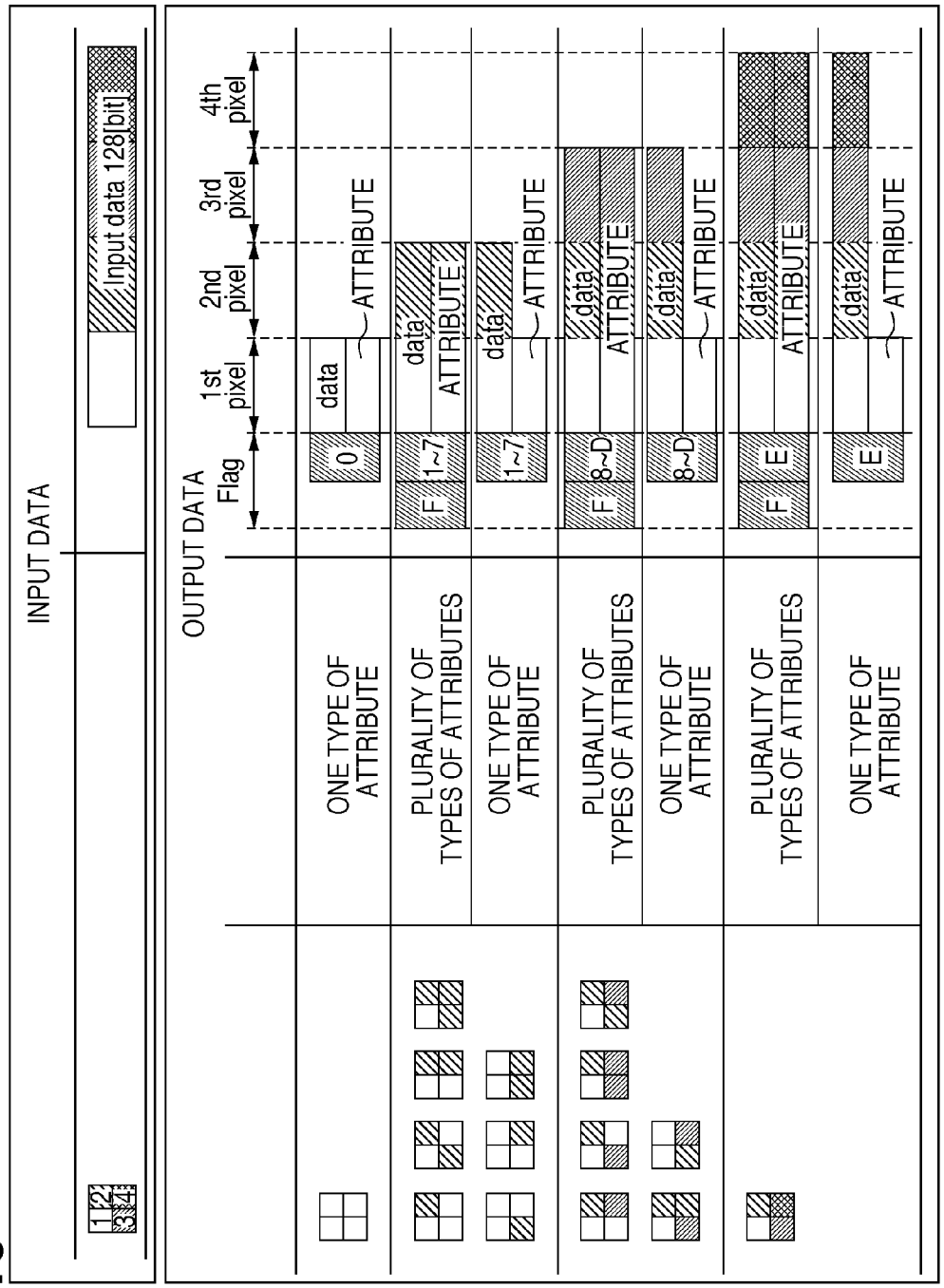
FIG. 10 is a view showing the relationship between the input and output upon compression processing according to the second embodiment.

FIG. 9 is a flowchart showing the sequence of image compression according to this embodiment. The sequence shown in FIG. 9 is the same as that shown in FIG. 5 in the first embodiment, except for the output processes in steps S530 to S535. In the second embodiment, identification flag "F" is added if it is determined in the branch processes in steps S522 to S524 that the block has a plurality of types of attribute data. In the second embodiment, this flag will be referred to as plural attribute identification flag "F". On the other hand, this flag is not added if the block has only one type of attribute data. The criterion according to which attribute identification flag "F" is added in this case is reverse to that in the first embodiment. FIG. 10 shows the relationship between input data and output data.

Since a compression code need only be able to be used to identify whether each block has only one type of attribute data, the schemes in both the first and second embodiments are viable. Either embodiment can be selected in accordance with whether blocks each having only one type of attribute data or blocks each having a plurality of types of attribute data appear at a higher frequency. Because the code length generally decreases upon assigning a short code to an event which has a high frequency of occurrence, the scheme in the second embodiment is suitable when the probability that each block has only one type of attribute data is high. That is, 4-bit identification flag "F" is not added if each block has only one type of attribute data, so the code used is shorter accordingly.

Third Embodiment

In the above-mentioned first and second embodiments, because 4-bit (16) flags are assigned while 15 layout patterns may occur in a block of 2×2 pixels, one unused flag (F) is effectively utilized as a flag for discriminating whether the block has a single or a plurality of attributes. That is, the latter flag is used for information (information for discriminating whether the block has a single or a plurality of attributes) other than the layout pattern while keeping the bit length of a pattern flag as small as 4 bits.

On the other hand, blocks having the same layout pattern and data type (the same types of color data and attribute data)

may continue when continuous blocks each including 2×2 pixels are evaluated, depending on the input image data. In view of this, in the third embodiment to be described below, the compression ratio is further improved using a technique of encoding the run length of identical blocks, together.

Figure 12:
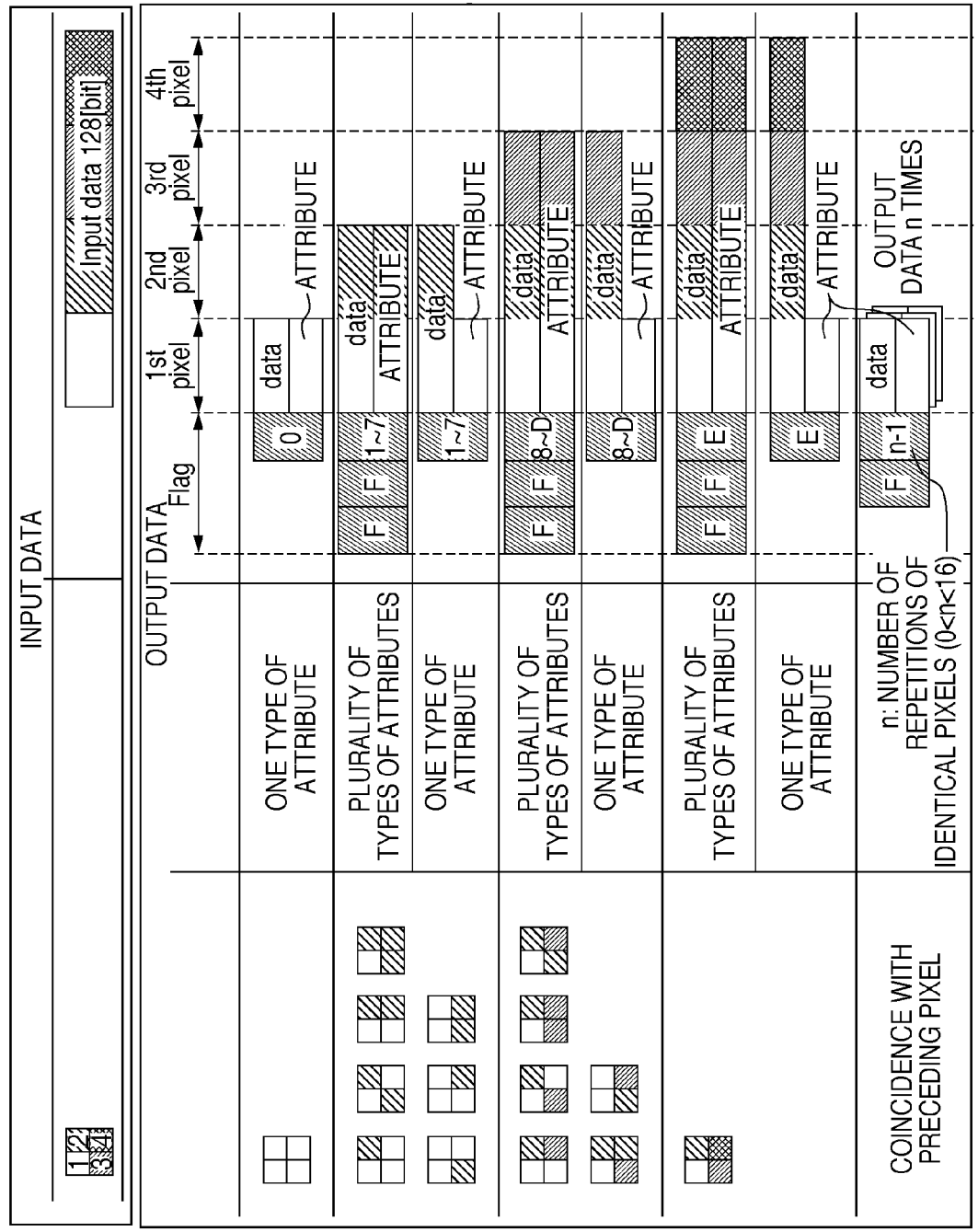
FIG. 12 is a view showing the relationship between the input and output upon compression processing according to the third embodiment.

A method of assigning a pattern flag will be described first with reference to FIG. 12. The method of assigning a pattern flag presented in FIG. 12 will be compared with that in the second embodiment presented in FIG. 10. In this case, the difference between the second and third embodiments lies in that in the former only one flag "F" is added as a plural attribute identification flag, while in the latter two continuous flags "F" are used instead. These two flags will be referred to as plural attribute identification flags "F, F" hereinafter.

In this embodiment, when values 0 to E follow after a single flag F, the continuous numerical values (0 to E) represent "(the number of repetitions n of blocks with the same layout as the immediately preceding block)−1". Hence, the number of repetitions n is (the numerical values (0 to E) after a single flag "F")+1. For example, when flag "0" follows a single flag "F" as pattern flags, mapping of a block with the same pixel layout as that of the immediately preceding block is repeated once. Upon defining the number of repetitions as n, the above-mentioned flag will be referred to as repeat flag "F, n−1" hereinafter.

Note that even if blocks with the same pixel layout continue, all blocks output sets of a first type of image data with an attribute. That is, a first type of image data with an attribute is output a number of times equal to the number of repetitions (n) of blocks with the same pixel layout, and stored in a first-type-of-image-data-with-attribute storage unit. If the block has a repeat flag, a first type of image data can also be restored by referring to the preceding block. However, as described above, sets of a first type of image data with an attribute are stored for all blocks to attach prime importance to the fact that the image data stored in the first-type-of-image-data-with-attribute can be used intact as a low-resolution sampled image. However, because no second to fourth types of data are output even if the block has these data, the compression ratio improves. Note that when the compression ratio is of prime importance, only repeat flag "F, n−1" can be added using neither a first type of image data with an attribute nor second to fourth types of data.

[Sequence of Processing]

Figure 11B:
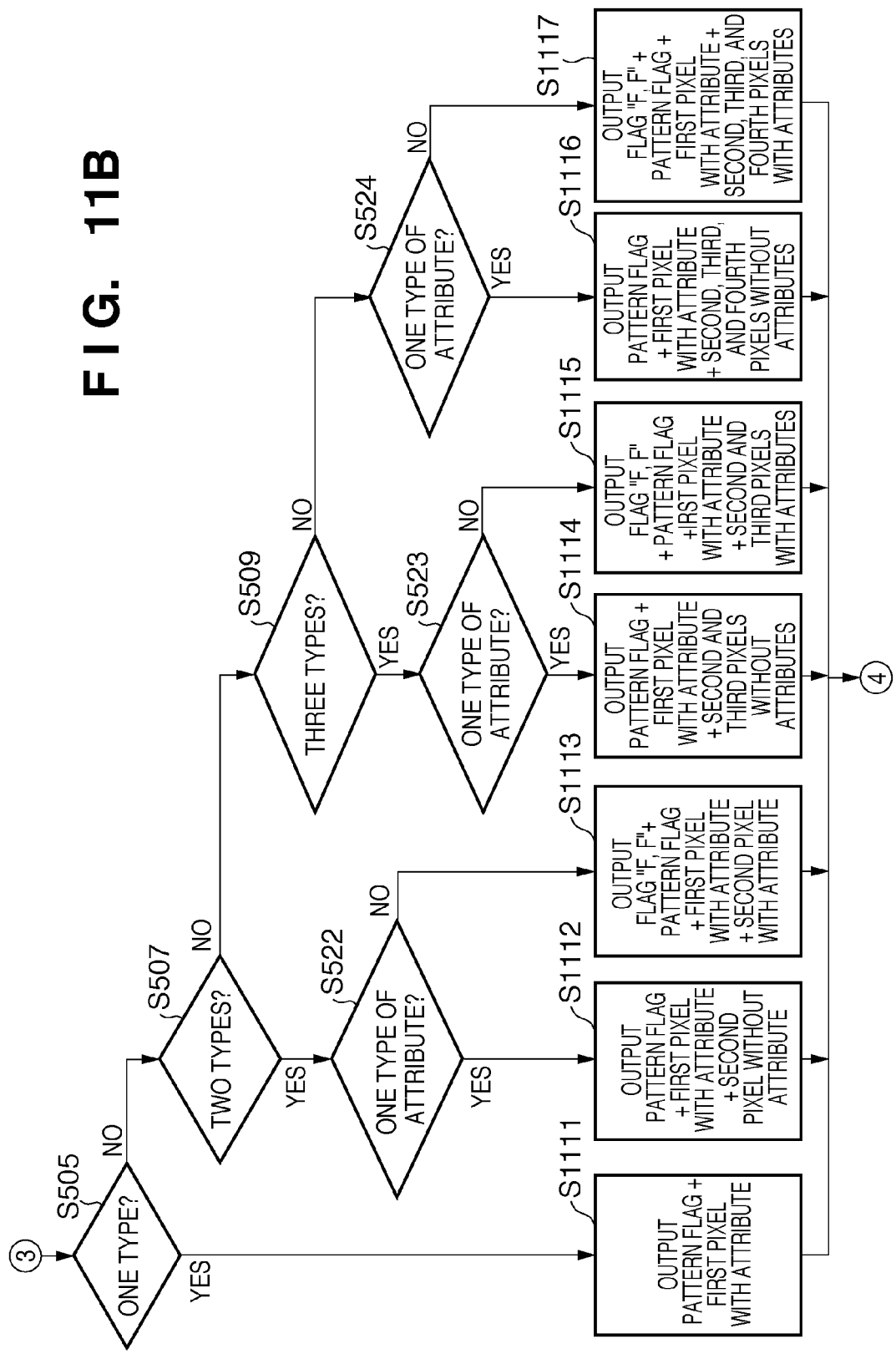

The sequence of image compression processing will be described with reference to FIGS. 11A and 11B. The compression unit executes this processing. First, image data with an attribute is input (S1101). The first block of 2×2 pixels divided from the input image data with an attribute is input (S1102). In step S502 and subsequent steps, compression processing of the first block is performed, and data is output. Note that the processes and branches in steps S502 to S524 are the same as those in corresponding steps in FIG. 9, and a description thereof will not be given. Likewise, the output processes in steps S1111 to S1117 are similar to those in steps S506 and S530 to S535 in FIG. 9. The difference lies herein that "F" is assigned and output twice instead of assigning and outputting "F" once when the block has more than one type of attribute data (that is, a plurality of types of attribute data). After a pattern flag and data are output and stored in respective storage units as compressed data by the process in one of steps S1111 to S1117, the compression unit temporarily stores the image data with an attribute in the block of 2×2 pixels in the buffer within the compression unit for the subsequent comparison (S1119). Note that block information stored at this time is identical to that input in step S1102.

In step S1118, the compression unit checks whether processing is complete for all blocks. If processing is complete, the sequence of this processing ends. If processing is not complete for all blocks (S1118), the process advances to step S1103. The compression unit holds a counter which counts up the number of repetitions of blocks, and initializes the repetition counter n (n=0) before starting to process the next block (S1103). The compression unit inputs the next block of 2×2 pixels to be processed in the input image data with an attribute (S1104). The compression unit determines whether the block stored in step S1119 and that input in step S1104 (S1105) coincide with each other. If the compared blocks do not coincide with each other (NO in step S1105), the compression unit evaluates the value n (S1107). If n=0 (YES in step S1107), the process advances to step S502, in which the above-mentioned processing is repeated. A second determination unit is thus implemented.

If the blocks compared in step S1105 coincide with each other (YES in step S1105), n is incremented by "1" (S1106). The compression unit evaluates the value n (S1108). If n≠15 (NO in step S1108), the process returns to step S1104, in which the next block of 2×2 pixels to be processed is input. Assume herein that identical blocks continue. When identical blocks continue, the counter value n increases. Because a repeat flag can indicate n=15 or less in this embodiment, the process advances to the output process in step S1110 when n=15 is detected in step S1108. In step S1110, repeat flag (F, E) (hexadecimal notation) which indicates that the immediately preceding block is repeated 15 times, and image data with an attribute of only a pixel corresponding to the first type in the preceding block is output 15 times. When this path is passed, identical blocks are still continuing, so the information recorded in the buffer is not updated, and the process returns to step S1103 via step S1118.

A case in which while the processes in steps S1104 to S1108 are repeated, a block which does not coincide with that stored in step S1119 appears and the repetition counter n≠0 (NO is determined in both steps S1105 and S1107) will be described next. For example, if the process branches to step S1107 when n=3, the process further advances to step S1109. Processing corresponding to the number of blocks repeated until a block which does not coincide with the stored block is input is executed (S1109). That is, if n=3, repeat flag "F, 2" is generated and output, the first type of image data with an attribute held in the buffer is generated and output three times, and these data are stored in the respective storage units. Step S1109 is different from step S1110 in the number of times of output and the value of the repeat flag. A newly input block which does not coincide with the stored block undergoes compression processing by the processes in step S502 and subsequent steps, and a flag and data are output.

The above-mentioned sequence is repeated for the entire input image with an attribute (S1118), thereby ending compression processing (S1120).

Although flag "F" is used to identify the number of types of attributes and to identify repetitions of blocks in this embodiment, another embodiment may be practiced. Also, although a compression technique which focuses attention on the continuity of blocks is added in the third embodiment based on the second embodiment, this technique may be implemented based on the first embodiment.

With the foregoing operation, it is possible not only to save the memory capacity and the memory bus bandwidth using a relatively simple compression scheme, but also to reduce the processing load in image processing or reduction scaling for each pixel.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-132412, filed Jun. 9, 2010, which is hereby incorporated by reference herein in its entirety.

What is claimed is:

1. An image processing apparatus comprising:
a division unit configured to divide image data, in which a data type of each pixel is represented by color data and attribute data, into blocks each having a size of M×N pixels;
a specification unit configured sequentially to determine, as a processing object, each of the blocks divided by said division unit, and to compare data types of respective pixels in the block that is the processing object, thereby specifying a flag indicating a layout pattern of data types included in each of the blocks;
a first determination unit configured to determine whether pixels included in a block including two data types to L (L=M×N) data types include a single type of attribute data; and
an output unit configured
to output, for a block which includes two data types to L data types and for which said first determination unit determines that pixels included in the block include a single type of attribute data, a flag indicating that the block includes a single attribute, a flag indicating a layout pattern of the block, a first type of color data and a first type of attribute data which are extracted from a pixel at a predefined position in the block, and a second type of color data to an Lth type of color data which are extracted based on the layout pattern of the block,
to output, for a block which includes two data types to L data types and for which said first determination unit determines that pixels included in the block include more than one type of attribute data, a flag indicating a layout pattern of the block, a first type of color data and a first type of attribute data which are extracted from a pixel at a predefined position in the block, and a second type of color data to an Lth type of color data and a second type of attribute data to an Lth type of attribute data which are extracted based on the layout pattern of the block, and
to output, for a block which includes only one data type, a flag indicating a layout pattern of the block, and a first type of color data and a first type of attribute data which are extracted from a pixel at a predefined position in the block.

2. An image processing apparatus comprising:
a division unit configured to divide image data, in which a data type of each pixel is represented by color data and attribute data, into blocks each having a size of M×N pixels;
a specification unit configured sequentially to determine, as a processing object, each of the blocks divided by said division unit, and to compare data types of respective pixels in the block that is the processing object, thereby specifying a flag indicating a layout pattern of data types included in each of the blocks;
a first determination unit configured to determine whether pixels included in a block including two data types to L (L=M×N) data types include a single type of attribute data; and
an output unit configured
to output, for a block which includes two data types to L data types and for which said first determination unit determines that pixels included in the block include a single type of attribute data, a flag indicating a layout pattern of the block, a first type of color data and a first type of attribute data which are extracted from a pixel at a predefined position in the block, and a second type of color data to an Lth type of color data which are extracted based on the layout pattern of the block,
to output, for a block which includes two data types to L data types and for which said first determination unit determines that pixels included in the block include more than one type of attribute data, a flag indicating that the block includes a plurality of attributes, a flag indicating a layout pattern of the block, a first type of color data and a first type of attribute data which are extracted from a pixel at a predefined position in the block, and a second type of color data to an Lth type of color data and a second type of attribute data to an Lth type of attribute data which are extracted based on the layout pattern of the block, and
to output, for a block which includes only one data type, a flag indicating a layout pattern of the block, and a first type of color data and a first type of attribute data which are extracted from a pixel at a predefined position in the block.

3. The apparatus according to claim 1, further comprising a second determination unit configured to determine whether a block of interest has a pixel layout identical to a pixel layout of an immediately preceding block to calculate a run length of blocks having an identical pixel layout,
wherein said output unit outputs, for a block for which said second determination unit determines that the block has a pixel layout identical to a pixel layout of an immediately preceding block, a flag indicating a run length of blocks having an identical pixel layout, and a first type of color data and a first type of attribute data which are extracted from a pixel at a predefined position in the block a number of times equal to the run length.

4. The apparatus according to claim 1, wherein the block having the size of M×N pixels includes a block having a size of 2×2 pixels, and the L types include four types.

5. The apparatus according to claim 4, wherein the flag indicating the layout pattern and the flag indicating that the block includes a single attribute are represented using flags each having a length of 4 bits.

6. The apparatus according to claim 1, further comprising a storage unit configured
to store, in a flag storage unit, the flags which are output from said output unit, to store, in a first-type-of-data storage unit, the first type of color data and the first type of attribute data which are output from said output unit, and to store, in a second-type-of-data-to-Lth-type-of-data storage unit, the second type of color data to the Lth type of color data and the second type of attribute data to the Lth type of attribute data which are output from said output unit.

7. An image processing method comprising:

a division step of using a division unit to divide image data, in which a data type of each pixel is represented by color data and attribute data, into blocks each having a size of M×N pixels;

a specification step of using a specification unit to sequentially determine, as a processing object, each of the blocks divided in the division step, and compare data types of respective pixels in the block that is the processing object, thereby specifying a flag indicating a layout pattern of data types included in each of the blocks;

a first determination step of using a first determination unit to determine whether pixels included in a block including two data types to L (L=M×N) data types include a single type of attribute data; and an output step of using an output unit to output, for a block which includes two data types to L data types and for which it is determined in the first determination step that pixels included in the block include a single type of attribute data, a flag indicating that the block includes a single attribute, a flag indicating a layout pattern of the block, a first type of color data and a first type of attribute data which are extracted from a pixel at a predefined position in the block, and a second type of color data to an Lth type of color data which are extracted based on the layout pattern of the block, output, for a block which includes two data types to L data types and for which it is determined in the first determination step that pixels included in the block include more than one type of attribute data, a flag indicating a layout pattern of the block, a first type of color data and a first type of attribute data which are extracted from a pixel at a predefined position in the block, and a second type of color data to an Lth type of color data and a second type of attribute data to an Lth type of attribute data which are extracted based on the layout pattern of the block, and output, for a block which includes only one data type, a flag indicating a layout pattern of the block, and a first type of color data and a first type of attribute data which are extracted from a pixel at a predefined position in the block.

8. An image processing method comprising:

a division step of using a division unit to divide image data, in which a data type of each pixel is represented by color data and attribute data, into blocks each having a size of M×N pixels;

a specification step of using a specification unit to sequentially determine, as a processing object, each of the blocks divided in the division step, and compare data types of respective pixels in the block that is the processing object, thereby specifying a flag indicating a layout pattern of data types included in each of the blocks;

a first determination step of using a first determination unit to determine whether pixels included in a block including two data types to L (L=M×N) data types include a single type of attribute data; and an output step of using an output unit to output, for a block which includes two data types to L data types and for which it is determined in the first determination step that pixels included in the block include a single type of attribute data, a flag indicating a layout pattern of the block, a first type of color data and a first type of attribute data which are extracted from a pixel at a predefined position in the block, and a second type of color data to an Lth type of color data which are extracted based on the layout pattern of the block, output, for a block which includes two data types to L data types and for which it is determined in the first determination step that pixels included in the block include more than one type of attribute data, a flag indicating that the block includes a plurality of attributes, a flag indicating a layout pattern of the block, a first type of color data and a first type of attribute data which are extracted from a pixel at a predefined position in the block, and a second type of color data to an Lth type of color data and a second type of attribute data to an Lth type of attribute data which are extracted based on the layout pattern of the block, and output, for a block which includes only one data type, a flag indicating a layout pattern of the block, and a first type of color data and a first type of attribute data which are extracted from a pixel at a predefined position in the block.

9. The method according to claim 7, further comprising a second determination step of using a second determination unit to determine whether a block of interest has a pixel layout identical to a pixel layout of an immediately preceding block to calculate a run length of blocks having an identical pixel layout, wherein in the output step, for a block for which it is determined in the second determination step that the block has a pixel layout identical to a pixel layout of an immediately preceding block, a flag indicating a run length of blocks having an identical pixel layout, and a first type of color data and a first type of attribute data which are extracted from a pixel at a predefined position in the block, are output both a number of times equal to the run length.

10. A non-transitory computer-readable medium storing a program for causing a computer to function as:

a division unit configured to divide image data, in which a data type of each pixel is represented by color data and attribute data, into blocks each having a size of M×N pixels;

a specification unit configured sequentially to determine, as a processing object, each of the blocks divided by the division unit, and compares data types of respective pixels in the block that is the processing object, thereby specifying a flag indicating a layout pattern of data types included in each of the blocks;

a first determination unit configured to determine whether pixels included in a block including two data types to L (L=M×N) data types include a single type of attribute data; and an output unit configured to output, for a block which includes two data types to L data types and for which the first determination unit determines that pixels included in the block include a single type of attribute data, a flag indicating that the block includes a single attribute, a flag indicating a layout pattern of the block, a first type of color data and a first type of attribute data which are extracted from a pixel at a predefined position in the block, and a second type of color data to an Lth type of color data which are extracted based on the layout pattern of the block, to output, for a block which includes two data types to L data types and for which the first determination unit determines that pixels included in the block include more than one type of attribute data, a flag indicating a layout pattern of the block, a first type of color data and a first type of attribute data which are extracted from a pixel at a predefined position in the block, and a second type of color data to an Lth type of color data and a second type of attribute data to an Lth type of attribute data which are extracted based on the layout pattern of the block, and to output, for a block which includes only one data type, a flag indicating a layout pattern of the block, and a first type of color data and a first type of attribute data which are extracted from a pixel at a predefined position in the block.

11. A non-transitory computer-readable medium storing a program for causing a computer to function as:

a division unit configured to divide image data, in which a data type of each pixel is represented by color data and attribute data, into blocks each having a size of M×N pixels;

a specification unit configured sequentially to determine, as a processing object, each of the blocks divided by the division unit, and compares data types of respective pixels in the block that is the processing object, thereby specifying a flag indicating a layout pattern of data types included in each of the blocks;

a first determination unit configured to determine whether pixels included in a block including two data types to L (L=M×N) data types include a single type of attribute data; and an output unit configured to output, for a block which includes two data types to L data types and for which the first determination unit determines that pixels included in the block include a single type of attribute data, a flag indicating a layout pattern of the block, a first type of color data and a first type of attribute data which are extracted from a pixel at a predefined position in the block, and a second type of color data to an Lth type of color data which are extracted based on the layout pattern of the block, to output, for a block which includes two data types to L data types and for which the first determination unit determines that pixels included in the block include more than one type of attribute data, a flag indicating that the block includes a plurality of attributes, a flag indicating a layout pattern of the block, a first type of color data and a first type of attribute data which are extracted from a pixel at a predefined position in the block, and a second type of color data to an Lth type of color data and a second type of attribute data to an Lth type of attribute data which are extracted based on the layout pattern of the block, and to output, for a block which includes only one data type, a flag indicating a layout pattern of the block, and a first type of color data and a first type of attribute data which are extracted from a pixel at a predefined position in the block.

12. The non-transitory computer-readable medium according to claim 10, wherein the program further causes the computer to function as:

a second determination unit configured to determine whether a block of interest has a pixel layout identical to a pixel layout of an immediately preceding block to calculate a run length of blocks having an identical pixel layout, wherein the output unit outputs, for a block for which the second determination unit determines that the block has a pixel layout identical to a pixel layout of an immediately preceding block, a flag indicating a run length of blocks having an identical pixel layout, and a first type of color data and a first type of attribute data which are extracted from a pixel at a predefined position in the block a number of times equal to the run length.

* * * * *